United States Patent [19]

Akesaka

[11] Patent Number: 5,193,938
[45] Date of Patent: Mar. 16, 1993

[54] METHOD AND APPARATUS FOR LAYING PIPE
[75] Inventor: Toshio Akesaka, Yokohama, Japan
[73] Assignee: Kabushiki Kaisha Iseki Kaihatsu Koki, Tokyo, Japan
[21] Appl. No.: 721,449
[22] PCT Filed: Jan. 28, 1991
[86] PCT No.: PCT/JP91/00088
§ 371 Date: Jun. 28, 1991
§ 102(e) Date: Jun. 28, 1991
[87] PCT Pub. No.: WO91/11563
PCT Pub. Date: Aug. 8, 1991
[30] Foreign Application Priority Data
Jan. 29, 1990 [JP] Japan .................. 2-16204
[51] Int. Cl.[5] .................. E02D 11/00; E02D 5/02
[52] U.S. Cl. .................. 405/154; 405/154; 405/283
[58] Field of Search .................. 405/138-145, 405/149, 154, 157, 282, 283

[56] References Cited
U.S. PATENT DOCUMENTS

| 3,543,522 | 12/1970 | Torti | 405/283 |
| 3,750,409 | 8/1973 | Orfei | 405/283 |
| 3,967,454 | 7/1976 | Barnes | 405/282 |
| 4,060,992 | 12/1977 | Heitkamp et al. | 405/174 X |
| 4,588,329 | 3/1986 | Gilchrist | 405/283 |
| 4,695,204 | 9/1987 | Bell | 405/283 |

FOREIGN PATENT DOCUMENTS

| 122103 | 10/1984 | European Pat. Off. | 405/143 |
| 2135782 | 1/1972 | Fed. Rep. of Germany | 405/283 |
| 55-36507 | 3/1980 | Japan . | |
| 60-80692 | 5/1985 | Japan . | |
| 1-284694 | 11/1989 | Japan . | |

Primary Examiner—Dennis L. Taylor
Assistant Examiner—John Ricci
Attorney, Agent, or Firm—Stoel Rives Boley Jones & Grey

[57] ABSTRACT

First and second frame assemblies (18, 20) are respectively provided with a pair of plate-like earth retainers (24, 36) and are alternately advanced by propulsion jacks (22). While the first and second frame assemblies are alternately advanced, the ground (14) is excavated to form a channel (16). A reaction force acting on the first frame assembly (18) when the second frame assembly (20) is advanced and a reaction force acting on the second frame assembly (20) when the first frame assembly (18) is advanced are respectively transmitted to the ground defining the channel by the action of first and second position maintaining force transmitting members and jacks (32, 52). When the first and second frame assemblies (18, 20) are advanced by required distances, a new pipe (12) is placed in the channel and connected to a pipe (12) already installed.

10 Claims, 5 Drawing Sheets

METHOD AND APPARATUS FOR LAYING PIPE

TECHNICAL FIELD

This invention relates to a method and an apparatus for laying pipe for a pipeline such as a sewer pipeline under the ground, and more particularly, to a method and an apparatus for laying pipe such as a box culvert by an open cut method.

BACKGROUND ART

One pipe laying apparatus used as an earth-retaining or sheathing apparatus for open cut works includes an approximately box-type frame in the whole form. This known apparatus involves a pair of side plates facing each other at a horizontal interval; a supporting frame attached to the side plates; and a plurality of jacks for advancing the supporting frame. In this known apparatus, earth pressure is received by the side plates, and a reaction force is received by a pipe which has been already placed within a channel (designated as a "pipe already installed" hereafter).

This known apparatus is advanced in the channel formed in the ground, while the channel is extended by a known machine, such as a back hoe. After the channel is extended by a required length, a new pipe is placed within the channel and connected to the pipe already installed. Specifically, an excavation and advance operation for excavating the ground while advancing the laying apparatus and a placement and connection operation for placing a new pipe in the channel and connecting the new pipe to the pipe already installed are performed alternately.

This known laying apparatus and methods for laying a pipe thereby, however, are based on loading the reaction force generated in advancing the apparatus on the pipe already installed. The excavation and advance operation is therefore not performed simultaneously with the placement and connection operation. A buffer material for preventing breakage of the end surfaces of the pipe already installed should be placed between the pipe already installed and the jack when the prior art apparatus is used. Further, a large-sized jack having a stroke larger than the length of the pipe to be installed should be used with this prior art device.

SUMMARY OF THE INVENTION

An object of the present invention is to provide apparatus for laying a pipe, in which the excavation of the ground and the advance operation of the apparatus are performed simultaneously with the placement and connection operation of a new pipe.

A method for laying a pipe according to the present invention comprises the steps of alternately performing a first process causing a first frame assembly disposed in a channel formed in the ground to advance in relation to a second frame assembly disposed within the channel and at the rear of the first frame assembly, while loading a reaction force acting on the second frame assembly on the ground; and performing a second process causing the second frame assembly to advance toward the first frame assembly, while loading a reaction force acting on the first frame assembly on the ground, the first frame assembly being provided with a pair of first plate-like earth-retaining means placed to face each other at a horizontal interval, and the second frame assembly being provided with a pair of second plate-like earth-retaining means placed to face each other at a horizontal interval; excavating earth and sand in front of the first frame assembly to extend the channel while alternately performing the first and second processes; and disposing a pipe in an excavated location.

An apparatus for laying a pipe according to the present invention includes a first frame assembly provided with a pair of first plate-like earth-retaining means placed to face each other at a horizontal interval and first connecting means for interconnecting both first earth-retaining means; a second frame assembly placed at the rear of the first frame assembly and provided with a pair of plate-like second earth-retaining means placed to face each other at a horizontal interval and second connecting means for interconnecting both second earth-returning means; drive means for relatively moving the first and second frame assemblies in forward and rearward directions; first position maintaining means for unlockably preventing the first frame assembly from moving in forward and rearward directions with respect to the ground by causing the reaction force acting on the first frame assembly to act on the ground; and second position maintaining means for unlockably preventing the second frame assembly from moving in forward and rearward directions with respect to the ground by causing the reaction force acting on the second frame assembly to act on the ground.

In pipe laying, the ground is excavated while the first and second frame assemblies advance alternately, and the channel is therefore extended. The reaction force acting on the second frame assembly in advancing the first frame assembly and the reaction force acting on the first frame assembly in advancing the second frame assembly are transmitted to the ground defining the channel.

When the first and second frame assemblies advance by required distances, a new pipe is placed in the channel and connected to a pipe already installed. While the new pipe is placed and connected to the pipe already installed, subsequent excavation and connection operations for excavating the ground and for advancing the laying apparatus are conducted.

Since the reaction force acting on the first and second frame assemblies is transmitted to the ground, it is not necessary in the present invention to load the reaction force generated in advancing the apparatus on the pipe already installed. In addition, it is possible to advance the first and second frame assemblies alternately. As a result, the excavation and advance operations are done simultaneously with the pipe placement and connection operation, and a jack with a small stroke can be used as drive means for propulsion.

While the first frame assembly is advanced, the reaction force can be transmitted to the ground by pressing at least a portion of the second frame assembly directly or indirectly against the channel. While the second frame assembly is moved, the reaction force can be transmitted to the ground by pressing at least a portion of the first frame assembly directly or indirectly against the channel.

Both second earth-retaining means may be connected to the second connecting means to pivot about an axis extending in the vertical direction. The second position maintaining means can be provided with a jack for displacing both second earth-retaining means, such that either of the front and rear end portions of both second earth-retaining means move apart from each other. In this manner, the reaction force acting on the second frame assembly is transmitted to the earth and sand contacting with both second earth-retaining means. This force transmittal is achieved by pressing either the front end portion or the rear end portion of both second earth-retaining means against the ground. The second earth-retaining means therefore acts as a member for transmitting the reaction force acting on the second frame assembly to the ground. As a result, the structure of the second position maintaining means is simplified.

The second frame assembly can be provided with a cylindrical member extending from one of the second earth-retaining means to the other. A slider capable of going in and out of the end portion of the cylindrical member is connected to each second earth-retaining means. In this embodiment, it is preferable that the jack is disposed within the cylindrical member to displace the slider against the cylindrical member, simplifying the structure of the second frame assembly.

It is preferable that both second earth-retaining means are connected to the second connecting means to pivot about an axis extending in the vertical direction and that both first earth-retaining means are connected to the first connecting means to be relatively indisplaceable. In this way, both first earth-retaining means are not relatively displaced in the forward and rearward directions. On the contrary, both second earth-retaining means are relatively displaced in those directions. Therefore, the laying apparatus is advanced along a curved path by advancing the first and second frame assemblies alternately when both second earth-retaining means are displaced in the forward or rearward direction.

The first position maintaining means can be provided with a plurality of plate-like reaction force transmitting members disposed within a hole formed in each first earth-retaining means. The drive means can also be provided with a plurality of jacks installed in a manner corresponding to the reaction force transmitting members. In this embodiment, it is preferable that each of the reaction force transmitting members is supported by the first earth-retaining means to pivot about the axis extending in the vertical direction. A cylinder or a piston rod of each jack is connected to a portion forward of the axis of the corresponding reaction force transmitting member, and the other (piston rod or cylinder) is connected to the second earth-retaining means. In this way, the drive means for advancing the apparatus also works as drive means for the reaction force transmitting member, so that the structure of the apparatus is simplified.

It is preferable that a recess opening (inward and rearward) is formed in each of the first earth-retaining means and that the second frame assembly is provided with a plate-like slider, slidably accepted in the recess in the forward and rearward directions. When the first and second frame assemblies of this embodiment are advanced alternately, a space in the connection position of both frame assemblies is closed by the slider such that part of the earth pressure is received by the plate-like slider.

DETAILED DESCRIPTION OF PREFERRED EMBODIMENTS

Figure 1:
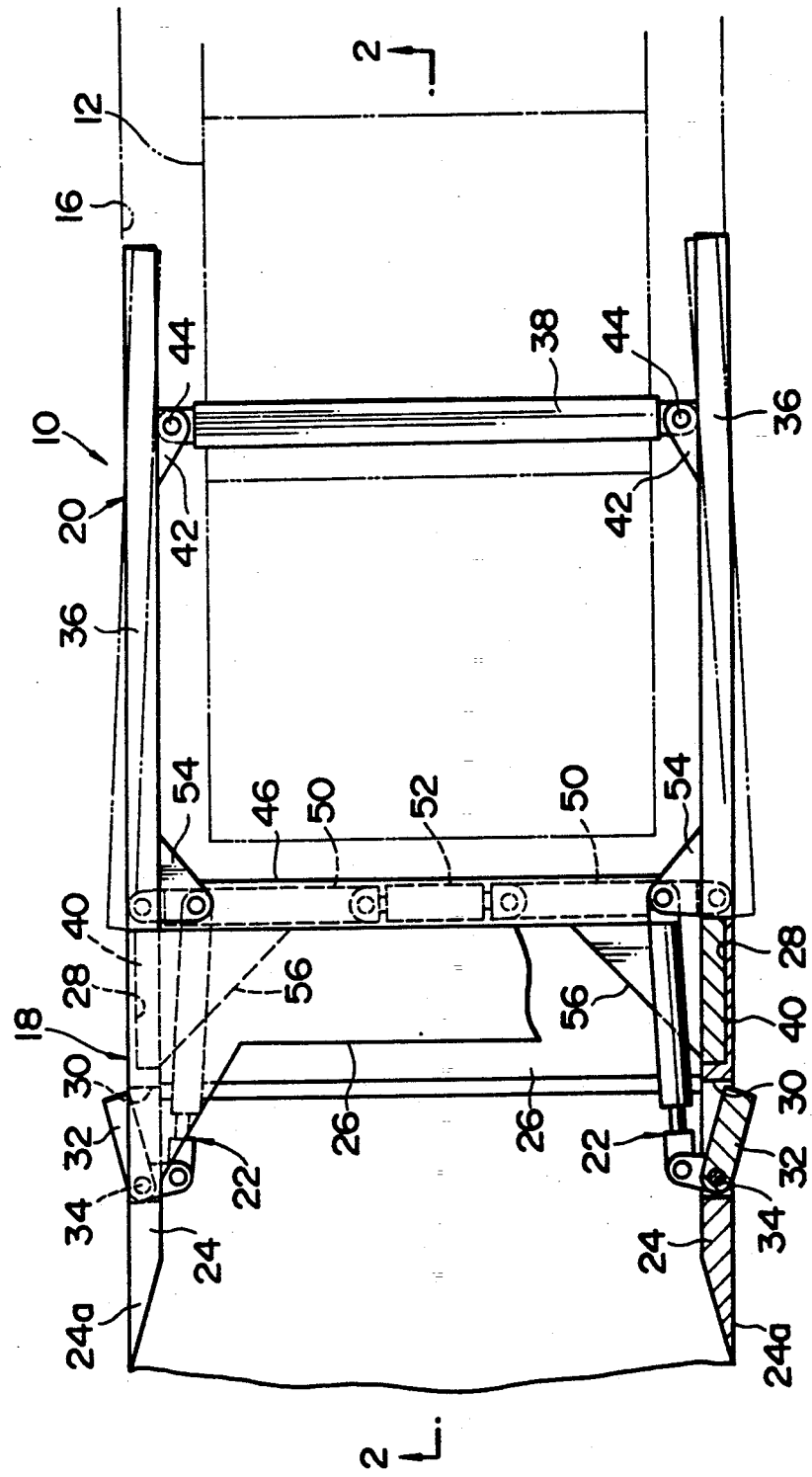
FIG. 1 is a top view showing an apparatus for laying a pipe of a preferred embodiment of the present invention.
Figure 2:
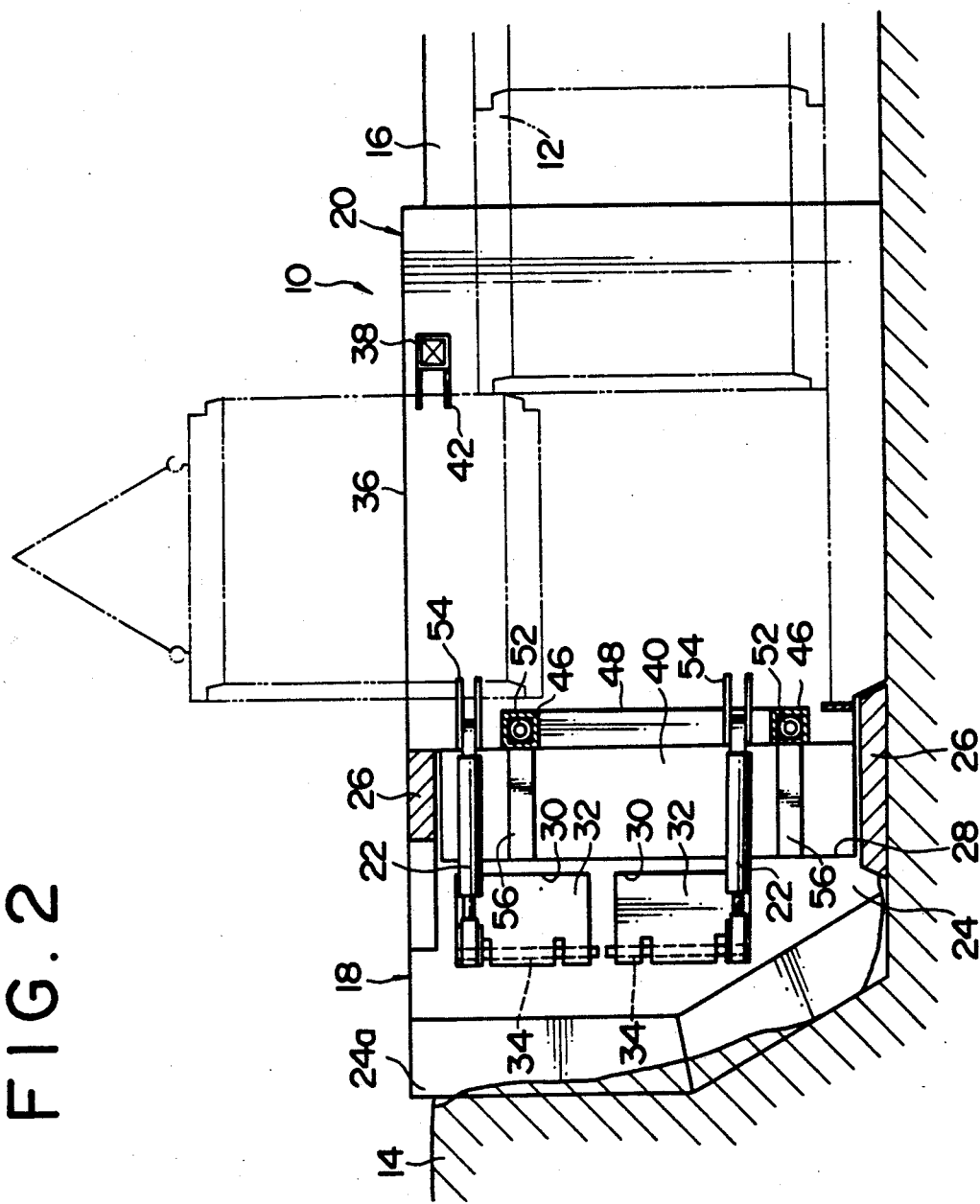
FIG. 2 is a sectional view taken along a line 2—2 of FIG. 1.
Figure 3:
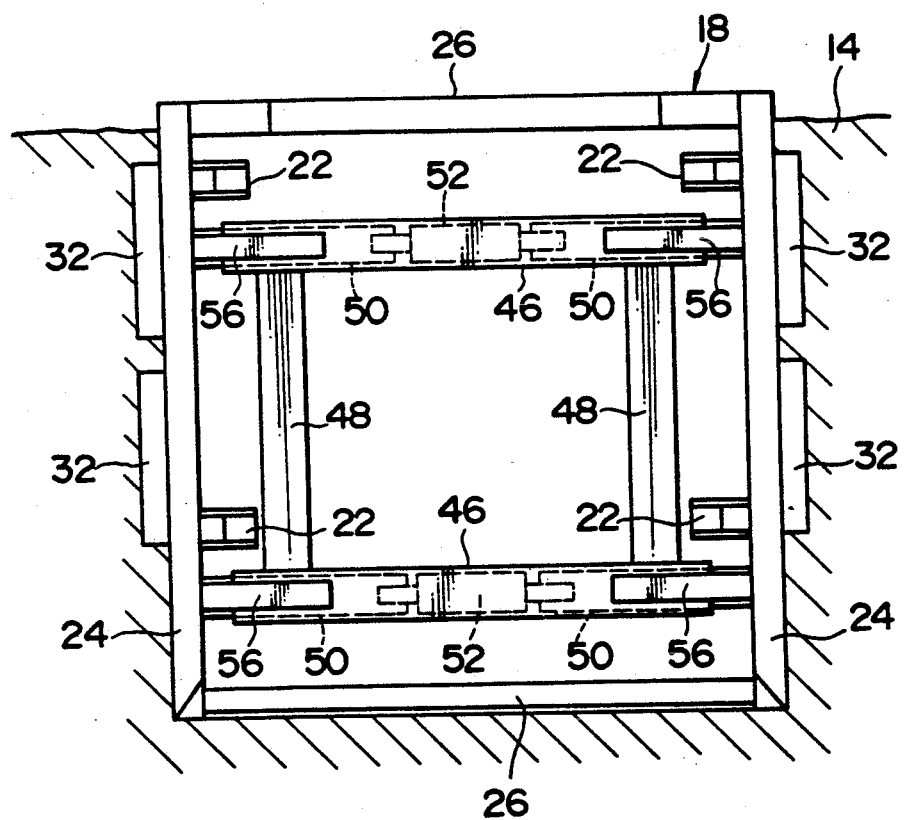
FIG. 3 is a front view showing the laying apparatus shown in FIG. 1.

An apparatus 10 for laying a pipe, shown in FIGS. 1, 2 and 3, is used in constructing a pipeline by placing pipes 12 such as a box culvert within a channel 16 excavated in the ground 14. The laying apparatus 10 includes a first frame assembly 18; a second frame assembly 20 placed rearward of the first frame assembly; and a plurality of propulsion jacks 22, i.e., drive means for relatively moving the first and second frame assemblies 18, 20 in the forward and rearward directions.

The first frame assembly 18 is provided with a pair of first side plates 24, i.e., plate-like first earth-retaining means placed to face each other and separated by an interval in the horizontal direction; and a pair of first connecting members 26, i.e., first connecting means for relatively indisplaceably interconnecting both first side plates 24. In an illustrated embodiment, each first side plate 24 has a cutting edge 24a at the forward end, and each connecting member 26 is composed of a plate-like member welded to the upper or lower ends of both side plates 24.

Each first side plate 24 has a recess 28 formed at the rearward end that opens inward and rearward, and two approximately rectangular holes 30 formed in the center of the first side plate 24 at an interval in the vertical (upward/downward) direction. A reaction force transmitting member 32 has an approximately rectangular plate-like form and is placed in each of the holes 30.

Each reaction force transmitting member 32 is installed to the first side plate 24 to angularly rotate about an axis extending in the vertical direction, by means of a shaft 34. Each reaction force transmitting member 32 is connected at the forward portion thereof to the piston rod of the jack 22 for propulsion and such that it closes the corresponding hole 30 when the first frame assembly 18 is advanced. The rearward end of each reaction force transmitting member 32 is projected from the corresponding first side plate 24 toward the periphery of apparatus 10 when the second frame assembly 20 is advanced. Therefore, both reaction force transmitting members 32 act as first position maintaining means for preventing the first frame assembly 18 from moving in the forward and rearward directions when the second frame assembly 20 is advanced. Alternatively, each reaction force transmitting member 32 may be driven by another jack instead of using the jack 22 for propulsion.

The second frame assembly 20 is provided with a pair of second side plates 36, i.e., a pair of plate-like second earth-retaining means placed to face each other and separated by an interval in the horizontal direction; a second connecting member 38, i.e., second connecting means for interconnecting both second side plates and a slider 40 received in the recess 28 of each first side plate 24 and movable in the forward and rearward directions. Each second side plate 36 is connected to the second connecting member 38 to angularly rotate about the axis extending in the vertical direction through a bracket 42 and a shaft 44.

At the forward end of the second frame assembly 20 is placed a pair of cylindrical members 46 disposed at an interval in the vertical direction and extending horizontally from one side of the second side plate 36 to the other side and a pair of pillars 48 for indisplaceably interconnecting the cylindrical members 46.

A pair of rod-like sliders 50 and a jack 52 connected to the sliders 50 are received in each cylindrical member 46. Each slider 50 is capable of protruding from and being contained within the end of the cylindrical member 46 and is connected to the second side plate 36 to angularly rotate about an axis extending in the vertical direction.

Each jack 52 is composed of a two-stage hydraulic jack having two jack portions. Also, each such jack 52 is fixed to the cylindrical member 46. The piston rod of each jack portion is connected to the slider 50. When each jack 52 is extended, the sliders 50 are protruded from the end of the cylindrical member 46. As a result, each second side plate 36 is angularly rotated about the shaft 44.

Consequently, when the jacks 52 are extended, the second side plates 36 are pressed against the ground located outside the second side plate 36, so that the sliders 50 and the jacks 52 act as second position maintaining means for unlockably preventing movement of the second frame assembly 20 in the forward and rearward directions.

The cylinder of each jack 22 used for propulsion is connected to a bracket 54 mounted on the second side plate 36 to rotate about an axis extending in the vertical direction. The plate-like sliders 40 are fixed to the cylindrical members 46 with a rib 56.

In the illustrated embodiment, the second connecting member 38 is disposed rearward of the cylindrical members 46 at a distance in excess of the length of a pipe 12 to be laid and is placed at a position higher (vertically) than the pipe 12. Otherwise, the second connecting member 38, the cylindrical members 46, the pillar members 48, the sliders 50 and the jacks 52 may be placed so that the rear end of each second side plate 36 protrudes to the periphery of apparatus 10 when the first frame assembly 18 is advanced.

Now, with reference to FIG. 4, a method for laying the pipe 12 will be explained.

Figure 4A:
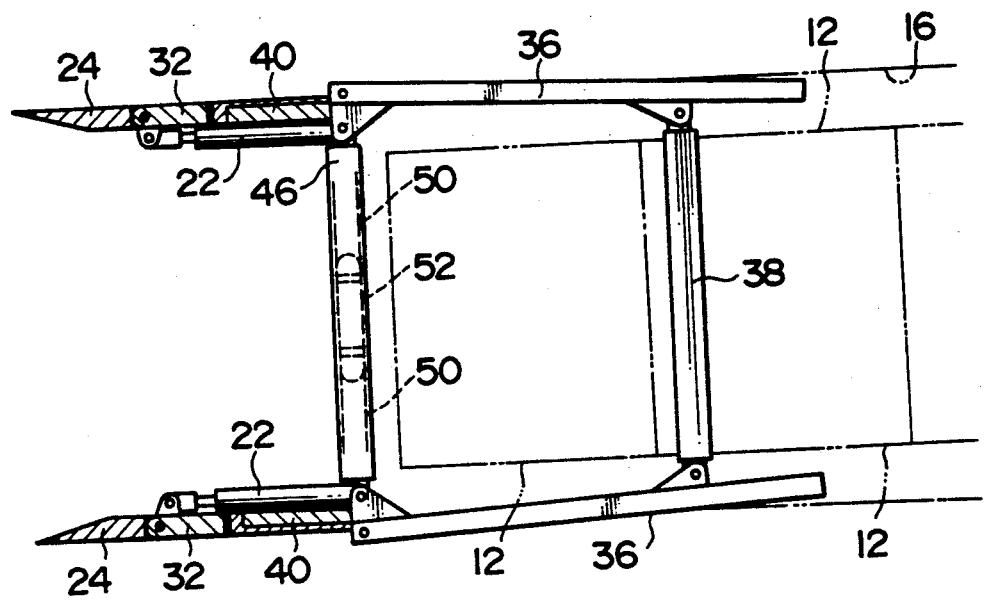
FIGS. 4(A), 4(B), 4(C) and 4(D) are top views for respectively explaining the operation of the laying apparatus.

First, as shown in FIG. 4(A), each jack 52 of the second position maintaining means is extended, and the sliders 50 protrude from the cylindrical member 46. In this manner, the second side plates 36 are angularly rotated about the shaft 44, such that the forward ends of the second side plates move apart from each other, and become pressed against the ground.

Figure 4B:
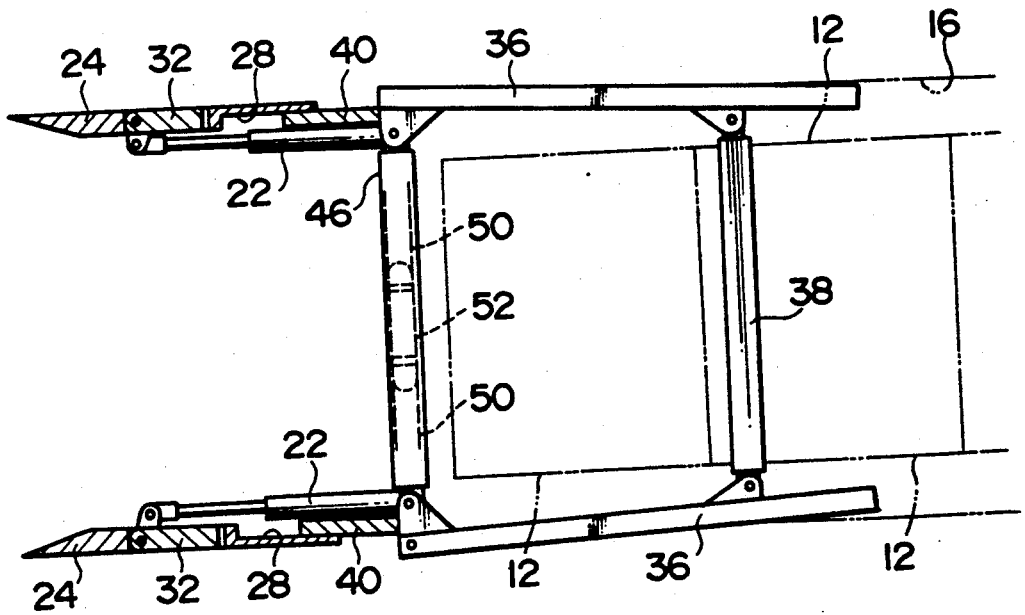

Subsequently, as shown in FIG. 4(B), each jack 22 used for propulsion is extended when each jack 52 is extended. The thrust of the jack 22 is therefore transmitted to the first frame assembly 18 through the reaction force transmitting member 32, advancing the first frame assembly 18 relative to the second frame assembly 20.

When the first frame assembly 18 is advanced, the reaction force transmitting members 32 are maintained in contact with a stopper (not shown) and are aligned with the first side plate 24. Each reaction force transmitting member 32 does not therefore prevent the first frame assembly 18 from advancing. In addition, the reaction force generated by the advance of the first frame assembly 18 is transmitted from the jack 22 to the ground 14 through the cylindrical members 46, the sliders 50 and the second side plates 36. Furthermore, with the advance of the first frame assembly 18, the first frame assembly 18 moves apart from the second frame assembly 20. The space between both frame assemblies 18, 20 is maintained in the closed condition by the plate-like sliders 40, however.

Figure 4C:
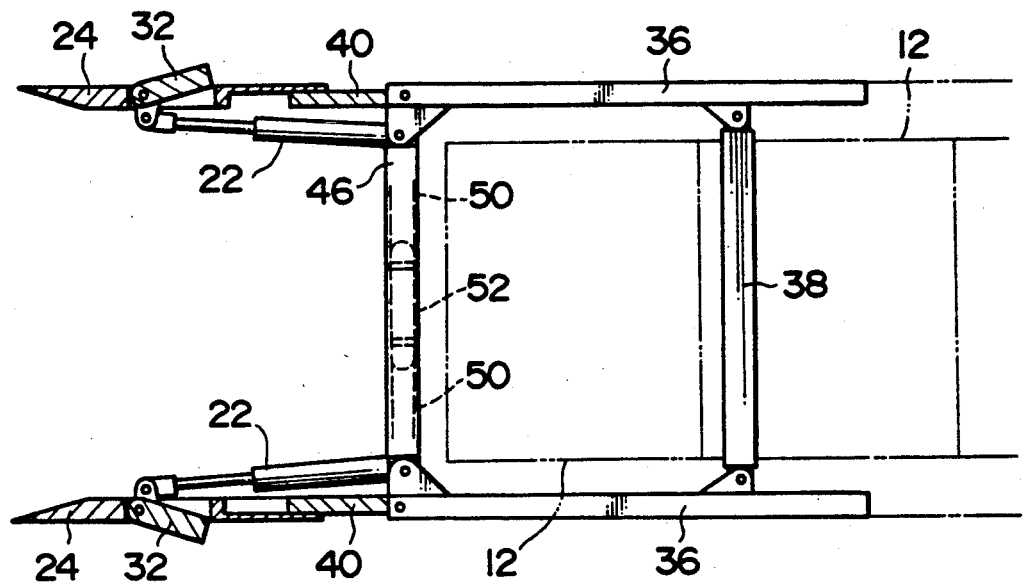
Figure 4D:
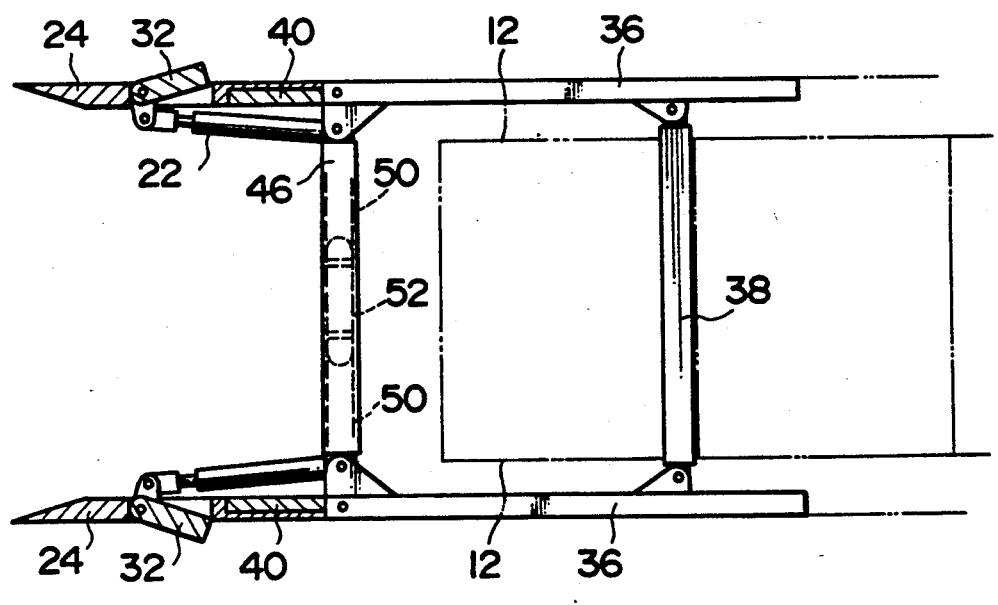

Subsequently, each jack 52 is contracted, as shown in FIG. 4(C). In this manner, the sliders 50 are drawn toward the jack 52, and therefore, the second side plates 36 are aligned in parallel. Each jack 22 used for propulsion is then contracted.

When each jack 22 is contracted, the reaction force transmitting member 32 protrudes from the first side plate 24 and presses against the ground, drawing the second frame assembly 20 toward the first frame assembly 18. At this time, the reaction force acting on the first frame assembly 18 is transmitted to the ground 14 through the reaction force transmitting member 32.

These processes for alternately advancing the first and second frame assemblies 18, 20 are repeated a plurality of times. While the first and second frame assemblies 18, 20 are advanced, the ground forward of the laying apparatus 10 is excavated by an excavating machine such as a back hoe to extend the channel 16.

When the laying apparatus 10 is advanced by a predetermined distance, a new pipe 12 is disposed from the upward direction in the space defined by the second side plates 36, the second connecting member 38 and the cylindrical members 46 (FIG. 1). The new pipe 12 is then connected to a pipe already installed. This operation, in particular, the connecting operation is performed in parallel with the excavation and advance operation for advancing the laying apparatus 10 and excavating the ground 14.

According to the laying apparatus 10 of the present invention, the second side plates 36 are connected to angularly rotate about the axis extending in the vertical direction. It is therefore possible to advance the apparatus 10 along a curved path by alternately advancing the first and second frame assemblies 18, 20 when the second side plates 36 are both displaced in the forward or rearward direction. This is achieved, for instance, by setting the expansion quantities of the jack 22 placed at one side of the apparatus 10 in the width direction of the channel 16 and the jack 22 placed at the other side to be different values.

When a pipe is laid at a position deeper than the heights of the first and second side plates 24, 36, auxiliary side plates similar to the first and second side plates 24, 36 may be connected to the upper sides of the first and second side plates 24, 36.

Furthermore, it is preferable that the bottom of the channel 16 is preliminarily graded using ballast, concrete or the like, so that the pipe 12 is level.

What is claimed is:
1. An apparatus for laying a pipe, comprising:
   a first frame assembly provided with a pair of first plate-like earth-retainers placed to face each other at a horizontal interval and first connecting means for interconnecting both said first plate-like earth-retainers;
   a second frame assembly disposed rearward of said first frame assembly and provided with a pair of second plate-like earth-retainers placed to face each other at a horizontal interval and second connecting means for interconnecting both said second plate-like earth-retainers;
   drive means for relatively moving said first and second frame assemblies in forward or rearward directions;

first position maintaining means for unlockably preventing said first frame assembly from moving in forward or rearward directions relative to ground by causing a reaction force acting on said first frame assembly to act on said ground; and second position maintaining means for unlockably preventing said second frame assembly from moving in the forward or rearward directions relative to said ground by causing a reaction force acting on said second frame assembly to act on said ground, wherein said second frame assembly is further provided with a cylindrical member extending from one side of said second plate-like earth-retainers toward the other and a slider capable of protruding from and being contained within said cylindrical member and connected to a corresponding second plate-like earth-retainers, and wherein said jack is disposed within said cylindrical member such that said slider is displaced relative to said cylindrical member; and wherein said second position maintaining means is provided with a jack for displacing both said second plate-like earth-retainers such that either of the forward and rearward ends of both said second plate-like earth-retainers are separated from each other.

2. An apparatus according to claim 1, wherein both said second plate-like earth-retainers are connected to said second connecting means to pivot about an axis extending in the vertical direction.

3. An apparatus according to claim 1, wherein both said first plate-like earth-retainers are connected by said first connecting means to be relatively indisplaceable.

4. An apparatus according to claim 1, wherein said first position maintaining means is provided with a plurality of plate-like reaction force transmitting members, each plate-like reaction force transmitting member being placed within a hole formed in a corresponding one of said first plate-like earth-retainers and being supported by said first plate-like earth-retainers to pivot about an axis extending in the vertical direction; and wherein said drive means is provided with a plurality of jacks corresponding to said plate-like reaction force transmitting members, one of a cylinder and a piston rod of each jack being connected to a portion forward of said plate-like reaction force transmitting member, and the other of said cylinder and said piston rod being connected to said second plate-like earth-retainers.

5. An apparatus according to claim 1, wherein each of said first plate-like earth-retainers as a recess opening inward and rearward, and wherein said second frame assembly has a plate-like slider, slidably accepted in said recess in forward and rearward directions.

6. An apparatus for laying a pipe, comprising:

a first frame assembly provided with a pair of first plate-like earth-retainers placed to face each other at a horizontal interval and first connecting means for interconnecting both said first plate-like earth-retainers;

a second frame assembly disposed rearward of said first frame assembly and provided with a pair of second plate-like earth-retainers placed to face each other at a horizontal interval and second connecting means for interconnecting both said second plate-like earth-retainers;

drive means for relatively moving said first and second frame assemblies in forward or rearward directions;

first position maintaining means for unlockably preventing said first frame assembly from moving in forward or rearward directions relative to ground by causing a reaction force acting on said first frame assembly to act on said ground; and second position maintaining means for unlockably preventing said second frame assembly from moving in the forward or rearward directions relative to said ground by causing a reaction force acting on said second frame assembly to act on said ground, wherein said first position maintaining means is provided with a plurality of plate-like reaction force transmitting members, each plate-like reaction force transmitting member being placed within a hole formed in a corresponding one of said first plate-like earth-retainers and being supported by said first plate-like earth-retainers to pivot about an axis extending in the vertical direction, and wherein said drive means is provided with a plurality of jacks corresponding to said plate-like reaction force transmitting members, one of a cylinder and piston rod of each jack being connected to a portion forward of said plate-like reaction force transmitting member, and the other of said cylinder and said piston rod being connected to said second plate-like earth-retainers.

7. An apparatus according to claim 6, wherein both said second plate-like earth-retainers are connected to said second connecting means to pivot about an axis extending in the vertical direction.

8. An apparatus according to claim 7, wherein said second frame assembly in further provided with a cylindrical member extending from one side of said second plate-like earth-retainers toward the other and a slider capable of protruding from and being contained within said cylindrical member and connected to a corresponding second plate-like earth-retainers, and wherein said jack is disposed within said cylindrical member such that said slider is displaced relative to said cylindrical member.

9. An apparatus according to claim 6, wherein both said first plate-like earth-retainers are connected by said first connecting means to be relatively indisplaceable.

10. An apparatus according to claim 6, wherein each of said first plate-like earth-retainers has a recess opening inward and rearward, and wherein said second frame assembly has a plate-like slider, slidably accepted in said recess in forward and rearward directions.

* * * * *